July 18, 1933.  W. N. SHELTON  1,918,937
COATED SHEET MATERIAL PRESENTING AN INFLATED PEBBLED
SURFACE AND PROCESS OF MAKING THE SAME
Filed Jan. 4, 1932

Inventor.
Wilbur N. Shelton
by Heard Smith & Tennant.
Attys.

Patented July 18, 1933

1,918,937

UNITED STATES PATENT OFFICE

WILBUR N. SHELTON, OF WELLESLEY, MASSACHUSETTS

COATED SHEET MATERIAL PRESENTING AN INFLATED PEBBLED SURFACE AND PROCESS OF MAKING THE SAME

Application filed January 4, 1932. Serial No. 584,691.

This invention relates to the process of producing sheet material from a viscous, plastic composition presenting a pebbled surface simulating the so-called "boucle" finish of textile material, and the sheet material produced thereby.

Ornamental surface designs upon sheets of coated material are usually produced by passing the sheet of coated material while in a more or less plastic state between a pair of rollers, one of which is engraved with a suitable pattern, thereby condensing such areas of the material as are engaged by the portions of the engraved roll which stand in relief, and conversely leaving the areas of the sheet which enter the intaglio portions of the engraved roll in substantially its original form.

More specifically the object of the present invention is to provide a sheet which is coated with a suitable viscous plastic composition capable of being permanized by drying or vulcanization with a surface presenting closely associated, individualized protuberances which are permanently inflated, and without interrupting the continuous surface of the sheet.

The process forming the subject of the present invention comprises thoroughly mixing into a batch of a suitable viscous plastic material a small amount of granular inflating material, such as an alkaline salt volatilizable by heat, until the granules of the inflating material are distributed with substantial uniformity throughout the mass. A suitable base sheet is then coated with the plastic mixture to a desirable thickness or gauge and the coated sheet thereafter subjected to heat for such predetermined period and at such predetermined temperature as will cause complete vaporization of the inflating material, thus producing individualized closed inflated cells within the body of the material, and also causing the walls of such inflated cells to protrude from the normal surface of the sheet, thereby producing closely associated individualized inflated protuberances of substantially uniform size, so that the face of the sheet presents a simulation of a "boucle" finish.

Preferably a sheet of the character above described having a pebbled surface appearance is produced by coating a suitable sheet of flexible material, such as a textile fabric, of felt, leather, or other fibrous material, with a coating of rubber or rubber composition comprising suitable vulcanizing and if desired accelerating agents, and having thoroughly mixed therein and disseminated therethrough fine granules of a volatilizable inorganic salt capable of volatilization at a temperature below the volatilizing temperature of said composition, such as sodium bicarbonate, or other salt selected from the group of carbonates, sodium phosphate, sponge paste, or the like, and calendering the coating to a predetermined gauge, and thereafter subjecting the coated sheet for a suitable predetermined time to a vulcanizing temperature sufficiently high to vaporize the inflating material.

I am aware that vaporizable granular inflating materials have heretofore been used in the production of cellular blocks or masses of rubber, such as sponge rubber, but so far as I am aware in all instances a sufficiently large proportion of granular inflating material is mixed with the rubber composition to produce when inflated a spongy cellular construction in which the walls of the cells are broken through so that the resulting article is sponge-like and capable when compressed and immersed in water of absorbing a very considerable quantity of water.

The present invention differs therefrom in that a relatively small proportion of granular inflating material is utilized so that the several cells formed by the vaporization of the granular material within the mass of rubber or other plastic composition are individualized and do not communicate with each other. The mixture, therefore, when applied to a suitable base, preferably a base of fibrous material, and subjected to heat for a suitable predetermined period and at a suitable predetermined temperature to vaporize the inflating material, produces a cellular structure in which the cells are individualized. Furthermore, the adhesion of the viscous plastic material to the surface of the base produces a substantially continuous surface which remains unbroken by the vaporization of the granules of inflating material which are located in proximity to the base, so that such expansion of the plastic material as occurs by reason of the production by inflation of individualized cells throughout the mass is away from the base, thereby increasing the thickness of the coating in proportion to the cellular structure thus produced.

Inasmuch as less resistance is offered by the viscous plastic material to cellular expansion caused by vaporization of granules located in proximity to the exposed surface of the coating, the plastic material is forced upwardly by such expansion to produce individualized cells having permanently distended walls as the cohesion of the particles of the viscous plastic material is sufficient to resist rupture. Upon complete vaporization of the granular inflating material, therefore, the surface of the coating is continuous and unbroken, although the surface of the sheet has a pebbled or "boucle" appearance.

While the process herein described may be performed manually by thoroughly mixing or kneading into a viscous plastic material, such as rubber composition, a small amount of the granular inflating material, then spreading the same upon a suitable base, such as a sheet of fibrous material to the desired thickness and thereafter subjecting the same for a sufficient period of time to heat at a temperature sufficient to vaporize the inflating material, the process desirably is performed by mechanical means.

Illustrative apparatus for performing the process and particularly with reference to the use of a rubber composition is shown in the accompanying drawing, in which, Fig. 1 is a diagrammatic illustration in vertical section of a mill in which the plastic composition or rubber is worked into a uniform consistency;

Figure 1:
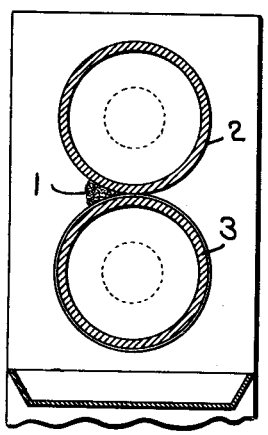
Figure 2:
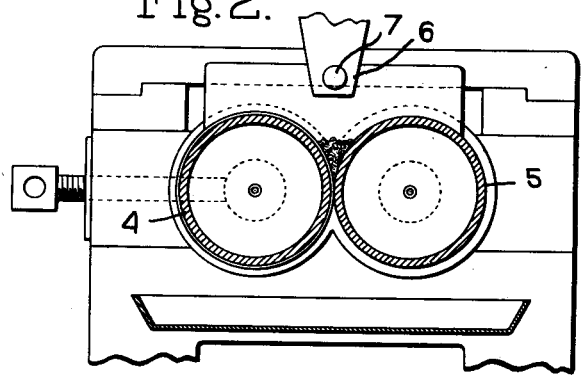
Fig. 2 is a similar view of a mixing mill in which the composition is warmed and further worked, and suitable curing agents and inflating material uniformly mixed into the plastic composition.
Figure 3:
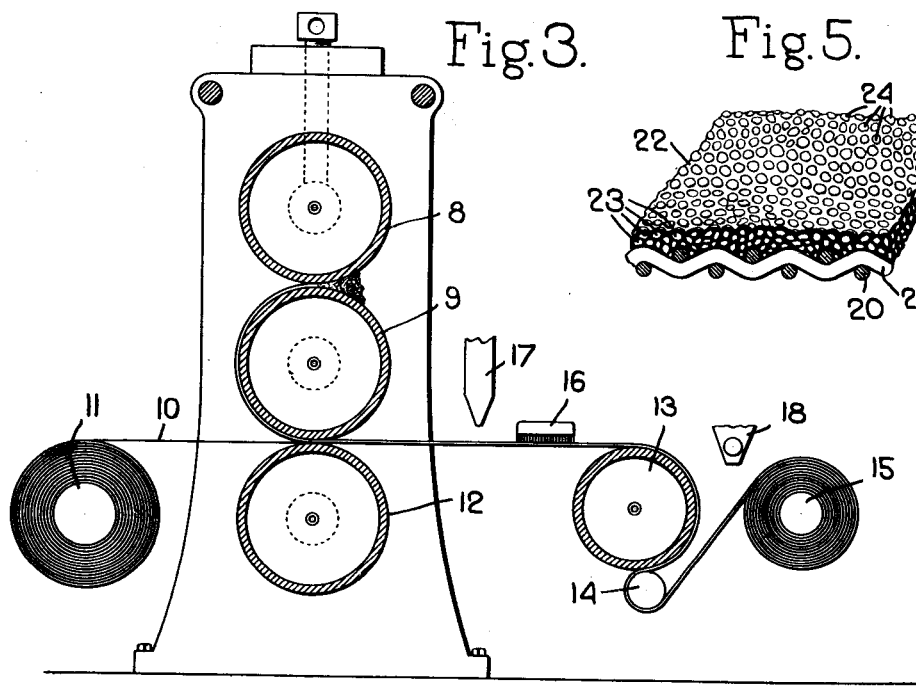
Fig. 3 is a mill in which the plastic material is further worked and applied to a sheet of flexible material to produce a coated sheet having a desired thickness and gauge, and also illustrating a heated drum for producing vaporization of the inflating material, and showing the coated sheet wound upon the take-off roll.

In the performance of the process by the apparatus illustrated herein a batch 1 of rubber, or other suitable viscous plastic composition, is introduced into the bite of suitably driven co-operating steam heated rolls 2 and 3, such as those used in the usual manufacture of rubber where it is worked by the rolls into uniform consistency and during such working adheres to the surface of one of said rolls. When it is worked a sufficient length of time, the operator slits the sheet upon the surface of the roll lengthwise and removes such portion of the sheet as is desired for further operation.

The segments of rubber, or other composition, is next introduced into the bite of the heated rolls 4 and 5 of a mixing mill where the material is further worked, and during such working suitable curing and accelerating material is introduced together with a small amount of inflating material, such as an alkaline salt, which is volatilizable in the presence of heat in excess of a predetermined minimum temperature. The various ingredients may be introduced into the mixing mill by hand, or may be fed into the batch from a suitable hopper 6 having therein a suitable distributor, such as a spiral conveyor 7, adapted to feed the material through a narrow slot or perforations in the bottom of the hopper. The mixture is worked in the mixing mill until the added ingredients are thoroughly and uniformly mixed throughout the plastic composition and the mass heated to a temperature rendering it sufficiently plastic for application to a base sheet. Slabs of the material are thereupon removed from the mixing rolls, as above described, and placed in the bite of the upper rolls 8 and 9 of a coating machine which sheets out the material and delivers it from the surface of the roll 9 upon the face of a base sheet of material 10 which is drawn from a spool 11 between the roll 9 and the lower roll 12.

The base sheet of material may be of any character, such as fabric, leather, paper, or composition material, but preferably is a textile material of a character suitable for the article to be produced from the coated sheet, and desirably a thin coating of rubber, or suitable composition, is applied to the base sheet to insure proper adhesion of the coating thereto, and more particularly to prevent the escape of any gases produced by vaporization of the inflating material through the base sheet.

Suitable means are provided for heating the rolls of the coating machine to a predetermined temperature as is usual in machines of this character. If the rolls of the coating machine are relatively cool, so that the composition is maintained at a temperature below 190-degrees Fahrenheit, the surface of the coating applied to the rolls will be substantially smooth. If, however, the rolls are heated to a higher degree, such for example as 210-degrees Fahrenheit, some vaporization of the inflating ingredients will take place, so that the surface of the coating will be of a somewhat pebbly appearance. The coated fabric may then be placed in a suitable vulcanizing chamber and volatilization of the inflating material completed. Other means may, however, be employed for completing the volatilization of the inflating material.

The coated sheet desirably is drawn from the rolls 9 and 12 around a heating drum 13 which may be supplied with steam in any suitable manner. Desirably the sheet is directed by a guide roller 14 around a very substantial portion of the drum 13, and thence to a take-off roll 15 upon which it is wound. The heating drum 13 may be maintained at a uniform temperature of sufficiently high degree to complete the vaporization of the volatile inflating material. As the granular material is volatilized, the gases liberated produce individualized cells, as the granules of the volatilized inflating material are so separated during the mixing operation that the expansion of the gases will not rupture the walls of viscous plastic material which separate them. Consequently, the coating, instead of being of a porous character, such as sponge rubber, will be characterized by numerous individualized permanently inflated cells.

Inasmuch as the base sheet, particularly when coated, prevents the escape of the gases produced by volatilization of the granular inflated material, the expension or "blow" caused by the volatilization of the material is toward the surface of the material and the vaporization of such granules as are in proximity to the surface produces protuberances from the surface without interrupting the continuity of the upper surfaces of the coating. The coated sheet, therefore, presents a continuous surface having, however, closely associated, permanently inflated, protuberances, thereby presenting a pebbled appearance which simulates quite closely the so-called "boucle" finish of textile materials.

If a dull finish is desired, pulverized carbon of lamp black may be applied to the roll before it passes around the drum 13 by a suitable brush 16 which may be manipulated by hand, or otherwise. If a glossy finish is desired varnish or shellac may be applied to the face of the sheet by a spray gun 17, or in any other suitable manner.

Desirably the surface of the coating is dusted with a suitable powder before being wound upon the take-off roll 15. This may be accomplished by spreading the dusting material on by hand, or from a hopper 18, with suitable feeding mechanism as above described.

Figure 4:
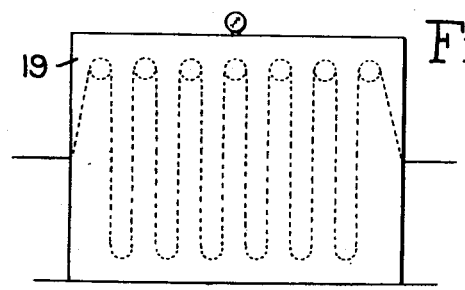
Fig. 4 is a diagrammatic elevation of a vulcanizing chamber showing the coated sheet festooned therein for curing or vulcanization; and, Fig. 5 is a perspective view of the coated sheet presenting a pebbled or "boucle" finish, also showing in large vertical section the fabric base of the sheet and the cellular character of the coating.

The coated sheet may be taken directly from the heating drum 13 or indirectly from the roll 15 and passed through or hung in festoons in a suitable vulcanizing chamber 19, as illustrated in Fig. 4, where it may be subjected to a predetermined curing or vulcanizing temperature for such period of time as may be required. Desirably the coated material is cured in the vulcanizing chamber at a temperature of approximately 245-degrees Fahrenheit for a period of approximately three and one-half hours not only to complete the vulcanization, but also to insure complete vaporization of the inflating material. The material when thus finished is ready for use. It is impervious to water and may be made into garments, such as rain coats, bags, belts, shoes, or numerous other uses which will be readily apparent to those skilled in the art.

A desirable formula for the preparation of a 71½ pound batch of material for producing the coating above described comprises 40 pounds of rubber, 30 pounds of color, filler, and curing ingredients, mixed together with one pound and 8 ounces of inflating composition, such as bicarbonate of soda, sodium phosphate, or other alkaline salt, volatilizable in the presence of heat, the relative proportions being, of course, variable in accordance with the character of the mixture or the size of the protuberances which it is desired to produce as a greater amount or coarser grains of the inflating material will produce larger protuberances. The gauge or thickness of the coating which is applied to the base sheet may be varied by adjustment of the rolls of the coating mill in a well known manner.

In making up the plastic composition a small amount of an anti-oxidant, such as commercial V. G. B., may be added to prolong the life of the material and prevent oxidation. Also, a small amount of an accelerator may be employed to assist in the cure and to shorten the length of time required to complete vulcanization. This is also beneficial in the creation of desired colors. Such an accelerator may be Monex or commercial D. P. G. or D. O. T. G., which are well known to those skilled in the art.

Figure 5:
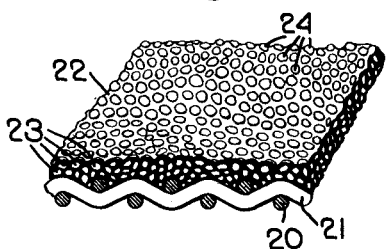

A graphic illustration of the sheet produced by the above process is illustrated in Fig. 5 which is an enlarged perspective view of a small portion of the sheet showing the base sheet as a textile fabric having warp threads 20 and weft threads 21 upon which the coating 22 of the composition containing the inflating material is adherently superimposed. After vaporization of the inflating material a severed edge of the sheet discloses numerous individual cells 23 substantially uniformly disposed throughout the mass with the walls of substantially all the cells unbroken and with the walls of the cells adjacent the upper edge of the sheet presenting permanently inflated and closely associated protuberances 24 substantially uniformly distributed and of substantially equal height, thereby presenting the pebbled surface or "boucle" finish above described.

It will be understood that the particular form of apparatus disclosed herein for performing the process is merely illustrative and that other suitable apparatus may be employed which is adapted to perform the process herein described. It will also be understood that the proportions of the materials and ingredients thereof, and particularly the amount of the inflating material, may be varied in accordance with the character of the finished goods which it is desired to produce. It will also be understood that other alkaline salts or materials other than those herein specifically mentioned and capable of vaporization in the presence of heat may be employed in the performance of the process and in the production of the material herein defined.

Having thus described the invention, what is claimed as new, and desired to be secured by Letters Patent, is:

1. A flexible sheet of waterproof material comprising a flexible fabric base provided with a coating of vulcanized rubber composition presenting a continuous outer surface of substantially uniform thickness presenting a substantially uniformly pebbled surface formed of closely associated, convexedly distended, permanent hollow protuberances produced by the process of claim 3.

2. A flexible sheet of waterproof material comprising a woven fabric having a thin coating of rubber cement adherent thereto and a relatively thick cellular coating of rubber composition coherent to said thin coating and presenting a substantially uniformly pebbled surface formed of closely associated, convexedly distended, permanent hollow protuberances produced by the process of claim 5.

3. The process of producing waterproof flexible sheet material presenting a surface having a pebbled appearance which comprises thoroughly mixing into and disseminating throughout a plastic vulcanizable rubber composition a relatively small amount of fine granules of a selected inorganic salt capable of volatilization at a temperature below the vulcanizing temperature of said composition, applying a coating of the mixture, while maintained at a temperature insufficient to volatilize the granules of said salt, to the surface of a flexible sheet of material capable of restricting the escape therethrough of gases produced by volatilization of said salt, and subjecting the coated sheet to heat at a temperature sufficient to vaporize the granules of salt confined in said composition thereby producing closely associated, permanently distended hollow convexedly rounded protuberances upon the surface of the sheet.

4. The process of producing waterproof flexible sheet material presenting a surface having a pebbled appearance which comprises thoroughly mixing into and disseminating throughout a plastic vulcanizable rubber composition a relatively small amount of fine granules of a selected inorganic salt capable of volatilization at a temperature below the vulcanizing temperature of said composition, applying a coating of the mixture, while maintained at a temperature insufficient to volatilize the granules of said salt, to the surface of a flexible sheet of material capable of restricting the escape therethrough of gases produced by vulcanization of said salt, and subjecting the coated sheet to a vulcanizing temperature for such predetermined period of time as will be required completely to vaporize the granules of salt confined in said composition and vulcanize said rubber composition, thereby producing a highly cellular coating of individualized cells and presenting a surface having closely associated, permanently distended, convexedly rounded, hollow protuberances.

5. The process of producing waterproof flexible sheet material presenting a surface having a pebbled appearance which comprises applying to a sheet of fabric a coating of rubber cement, cohesively applying to said coating of rubber cement a relatively thick coating of plastic vulcanizable rubber composition having intimately disseminated therethrough a relatively small amount of fine granules of a selected inorganic salt capable of volatilization at a temperature below the vulcanizing temperature of said composition, subjecting the coated sheet to a vulcanizing temperature for such period of time as completely to vaporize the granules of salt confined in said composition and vulcanize said rubber composition, thereby producing closely associated, permanently distended, convexedly rounded, hollow protuberances upon the surface of the sheet.

6. The process of producing waterproof flexible sheet material presenting a surface having a pebbled appearance which comprises thoroughly mixing into and disseminating throughout a plastic vulcanizable rubber composition a relatively small amount of fine granules of a suitable inorganic salt selected from a group of carbonate salts, applying to the surface of a sheet of closely woven fabric a coating of the mixture while maintained at a temperature insufficient to volatilize the granules of said salt, heating the coated sheet sufficient to vaporize the granules of salt confined in said composition and to vulcanize said composition, thereby producing closely associated, permanently distended, convexedly rounded, hollow protuberances upon the surface of the sheet.

7. The process of producing waterproof flexible sheet material presenting a surface having a pebbled appearance which comprises thoroughly mixing into and disseminating throughout a plastic vulcanizable rubber composition a relatively small amount of fine granules of a suitable inorganic salt capable of volatilization at a temperature below the vulcanizing temperature of said composition, applying to the surface of a flexible sheet of material a coating of the mixture while maintained at a temperature insufficient to volatilize the granules of said salt, applying heat to the fabric side of said coated sheet at such predetermined temperature and for such predetermined time as to vaporize the granules of salt confined in said composition and to vulcanize said rubber composition, thereby producing closely associated, permanently distended, convexedly rounded, hollow protuberances upon the surface of the sheet.

8. The process of producing a flexible sheet of material having a pebbled surface which comprises thoroughly mixing with rubber suitable filling and curing ingredients together with sodium bicarbonate in approximately the proportions of one and one-half pounds of a finely divided granular sodium bicarbonate, forty pounds of rubber, and thirty pounds of filling, curing and coloring material, coating a sheet of fibrous material with said mixture, and subjecting the coated sheet for a predetermined period to a vulcanizing temperature sufficient fully to vaporize the sodium bicarbonate, thereby to produce closely associated, individualized, permanently distended, rounded protuberances upon the face of the sheet.

9. The process of producing a flexible sheet of material having a pebbled surface which comprises thoroughly mixing with rubber suitable filling and curing ingredients together with a relatively small amount of a finely divided granular volatilizable sodium bicarbonate, coating a sheet of fibrous material with said mixture, and subjecting the coated sheet for a predetermined period to a vulcanizing temperature sufficient fully to vaporize the alkaline salt, thereby to produce closely associated, individualized, permanently distended, rounded protuberances upon the face of the sheet, and applying to the face of the sheet a suitable finishing material.

10. The process of producing a flexible sheet of material having a pebbled surface which comprises thoroughly mixing with rubber suitable curing and filling ingredients together with a relatively small amount of finely divided granular volatilizable sodium bicarbonate, coating a sheet of fibrous material with said mixture, and subjecting the coated sheet for a predetermined period to a vulcanizing temperature sufficient fully to vaporize the sodium bicarbonate, thereby to produce closely associated, individualized, permanently distended, rounded protuberances upon the face of the sheet, and varnishing the surface of the sheet.

WILBUR N. SHELTON.